United States Patent Office 3,338,954
Patented Aug. 29, 1967

---

3,338,954
CYANO-CONTAINING AMINO ESTERS OF ACRYLIC AND METHACRYLIC ACID
Russell T. McFadden, Freeport, and Clarence R. Dick, Lake Jackson, Tex., assignors to The Dow Chemical Company, Midland, Mich., a corporation of Delaware
No Drawing. Filed Oct. 8, 1964, Ser. No. 402,636
6 Claims. (Cl. 260—465.4)

This invention relates to novel N-cyanoalkyl-2-aminoethyl acrylates, methacrylates, their inorganic acid salts, and to the preparation of such compounds. The invention also concerns the use of these novel compounds for the preparation of acrylic compositions with superior adhesion and water-resistant properties.

Acrylates and methacrylates which contain both an amino nitrogen atom and a cyano group within the molecule are known. A class of such compounds is disclosed, for example, in U.S. 2,834,765 to De Benneville. In these disclosed compounds, however, the cyano group is attached directly to the amino nitrogen atom.

The esters of the present invention are prepared by a ring-opening reaction carried out with an N-substituted aziridinyl compound and acrylic or methacrylic acid. The reactions may be represented as follows:

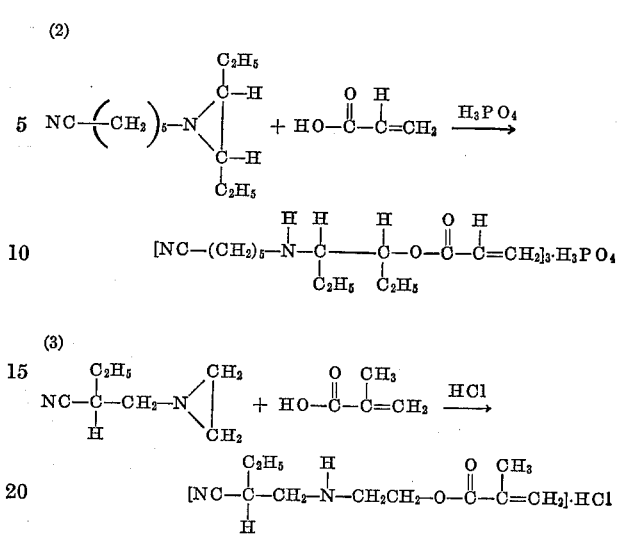

wherein $n$ is an integer of up to 5 (preferably 2 to 4), $m$ is an integer of from 1 to 3 representing the valence of the anion A, each of $R_0$ and R is a hydrogen atom or an alkyl group of from 1 to 4 carbon atoms (such as methyl, ethyl, n-propyl, i-propyl, n-butyl, sec.-butyl, tert.-butyl, or i-butyl), A is an inorganic anion (such as a halide, $Cl^-$, $Br^-$, $I^-$, $F^-$, $PO_4^\equiv$, $SO_4^=$, $HPO_4^=$, etc.) and $R_1$ represents a hydrogen atom or the methyl group. Preferred $H_mA$ acids are those which form water soluble salts with the novel acrylate and methacrylate esters of the invention. Each of $R_0$ and R may thus be represented by the formula $(C_kH_{2k})H$ wherein $k$ is an integer of from 0 to 4, whereas $R_1$ may be represented by the group $(C_xH_{2x})H$ wherein $x$ is an integer of from 0 to 1.

Typical reactions within the scope of the invention include the following:

(1)
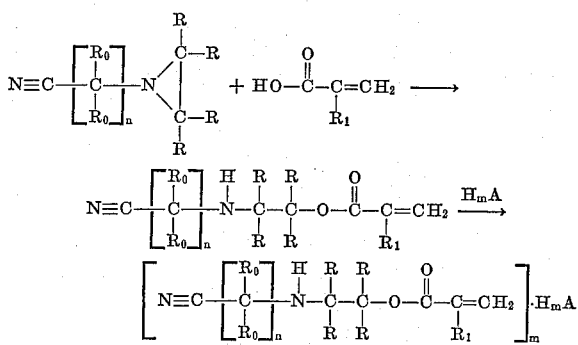

(2)
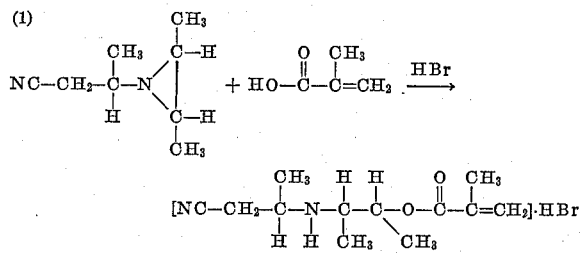

(3)

When acrylic acid is to be esterified, the reaction solvent used is preferably a halohydrocarbon (such as 1,1,1-trichloroethane). However, when methacrylic acid is esterified, the process is simplified and improved results are obtained by the use of a hydrocarbon solvent (such as n-hexane), as disclosed in copending patent application Serial Number 384,768.

The compounds of the invention improve the adhesion properties of conventional acrylate latexes when added to the water phase (or oil phase) prior to emulsifying the oil phase. The oil phase may be composed of mixtures of ethyl acrylate, methyl methacrylate, methacrylic acid, and acrylic acid. Other conventional acrylate formulations may also be used. The water phase generally contains various commercial preservatives (organo-mercury compounds for example), anti-foam agents (salts of sulfated fatty acids), emulsifiers (alkanolamine condensates), as well as polyethylene glycols, ethylene glycol, pigments (such as $TiO_2$), and fillers such as clay, mica, etc. The oil and water phases are then combined and heated (temperature 40° C. to 95° C.) using hydrogen peroxide initiator promoted with heavy metal ion polymerization catalysts (such as $Fe^{+3}$, $Cu^{+2}$) by the usual emulsion polymerization techniques. The cyano-containing compounds of the invention are employed in amounts sufficient to enhance the adhesion properties of the acrylic latexes. Usually amounts of from 0.025 to 3.0 parts per 100 parts of final acrylic latex composition gives good results. Amounts in excess of 3–5 percent (by weight) may be employed, but only minor additional increases in adhesion are obtained thereby. The compounds of the invention may be used to increase the adhesion of any acrylate-based latex (i.e., a latex containing at least about 10 percent by weight of an acrylate or methacrylate polymer or copolymer).

The compounds of the invention also improve the adhesion properties of non-aqueous acrylate and methacrylate polymers and/or copolymers (especially coating compositions).

The following examples are submitted for the purpose of illustration only and are not to be construed as limiting the scope of the invention in any way.

EXAMPLE I—PREPARATION OF N-CYANOETHYL-2-AMINOETHYL METHACRYLATE HYDROCHLORIDE

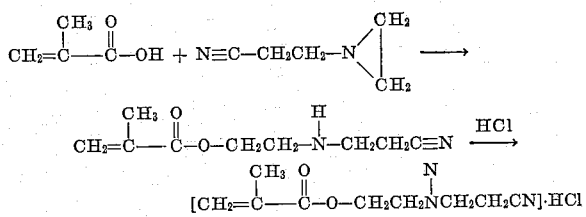

Into a reaction vessel equipped with a means for agitating, purging, temperature control, refluxing and continuous reagent addition was added 36.4 grams (.424 mole) glacial methacrylic acid, 36.4 grams n-hexane and .0364 gram p-methoxy phenol (as a polymerization inhibitor). The temperature was raised to 60° C. with stirring and 9.0 grams (.094 mole) N-cyanoethyl aziridine was added dropwise over a period of 1½ to 2 hours. The mixture containing N-(cyanoethyl)-2-aminoethyl methacrylate as its methacrylic acid salt was then cooled to 30° C. and anhydrous hydrogen chloride was bubbled in until a slight excess was present. During this period a white precipitate formed and it became necessary to add 18.2 grams of additional hexane to maintain a fluid mixture. The slurry was filtered and the white pasty product collected. This product was slurried with an equal weight of acetone and refiltered to yield 98% pure N-(cyanoethyl)-2-aminoethyl methacrylate hydrochloride in 64% yield. The compound analyzed as follows:

|   | Actual, percent | Theory for $C_9H_{15}ClN_2O_2$, percent |
|---|---|---|
| C=C | 10.72 | 10.98 |
| Cl⁻ | 16.0 | 16.20 |
| C | 52.55 | 49.5 |
| H | 7.18 | 6.86 |
| N | 12.52 | 12.8 |
| Equivalent wt. by base titration | 221.0 | 219.0 |

EXAMPLE II—PREPARATION OF N-CYANOETHYL-2-AMINOETHYL ACRYLATE HYDROCHLORIDE

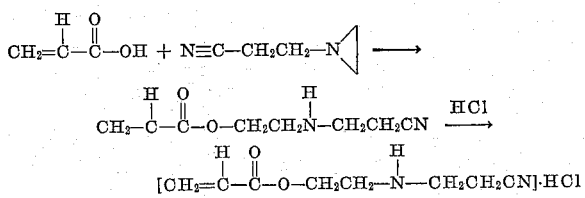

The same procedure as used in Example I was followed, but with the following reaction mixture:

| | |
|---|---|
| Glacial acrylic acid | 288.0 grams (4.00 moles). |
| Cyanoethyl aziridine | 98.0 grams (1.00 mole). |
| Hydroquinone | 5.76 grams. |
| Trichloroethane | 288.0 grams. |

The crude salt product separated as a viscous oil, and was washed three times by stirring with three times its original volume of hot trichloroethane at 50° C. for 20 minutes.

The product, N-(cyanoethyl)-2-aminoethyl acrylate hydrochloride, was a very viscous, clear, colorless syrup which analyzed as follows:

|   | Actual | Theory for $C_8H_{13}ClN_2O_2$ |
|---|---|---|
| C | 49.0 | 47.0 |
| H | 6.90 | 6.35 |
| N | 11.9 | 13.7 |
| Equivalent wt. by base titration | 201.0 | 204.0 |

EXAMPLE III—PREPARATION OF AN ACRYLATE-BASED LATEX CONTAINING N-CYANOETHYL-2-AMINOETHYL METHACRYLATE HYDROCHLORIDE

An oil phase (B) was prepared by combining the following in the indicated proportions:

| Component: | Parts by weight (grams) |
|---|---|
| (1) Ethyl acrylate | 1000 |
| (2) Methyl methacrylate | 472 |
| (3) Methacrylic acid | 15 |
| (4) Acrylic acid | 12 |

General procedure

A 12.0 gram sample of N-(cyanoethyl)-2-aminoethyl methacrylate·HCl was dissolved in 144 milliliters of pure water. Concentrated aqueous hydrochloric acid was added to adjust to pH of this solution to 2.0; 52.8 grams of this solution was put in the reactor. To the remainder of this solution was added 82.7 grams of ethoxylated nonylphenol (30:1 ethylene oxide:nonylphenol), and this mixture was set aside. Next, 5.75 grams of stearyl dimethyl benzyl ammonium chloride was mixed with 1390 grams of water containing 3.0 p.p.m. of $Fe^{+3}$ (as ferric chloride), and this mixture was added to the reactor. The mixture in the reactor was stirred continuously while the air-space was purged with methane and the mixture was brought to 70° C. by external heating. The methane purge was discontinued and, still with stirring, addition of the oil phase (B) was begun to the aqueous mixture in the reactor. The rate of addition was adjusted so as to be complete in four to five hours. Concurrently, 48.0 grams of 30% (weight) hydrogen peroxide (aqueous) was added to the reactor from a separate reservoir. The temperature of the reactor contents was maintained at 70° C. throughout the procedure. One hour after beginning the addition of the oil phase (B), one-third of the aqueous solution of N-(cyanoethyl)-2-aminoethyl methacrylate+HCl which had been set aside was added to the reactor all at once. One hour after this, a second third was added, and one hour after that, the last third.

After completing the addition of the oil phase (B), the reactor contents were heated at 70° C. for three more hours. The latex was then cooled to 25° C. and sufficient 28% aqueous ammonia was stirred into the latex to bring the pH to 8.5, ±0.5. Rapid agitation was used. The neutralized latex was filtered through a 100-mesh stainless steel screen.

Example IV

Using the general procedure of Example III, a latex containing 12.0 gm. of N-cyanoethyl-2-aminoethyl acrylate hydrochloride in place of the N-cyanoethyl-2-aminoethyl methacrylate hydrochloride was prepared.

Example V

Using a general procedure identical to that of Example III, but with the omission of an acrylate or methacrylate hydrochloride salt additive, a straight latex was prepared for comparison.

Topcoat paint formulations were then prepared from each of the latexes of Examples III–V by blending 490 grams of each of these latexes for 5 minutes on a mechanical paint shaker with a pigment slip containing the following ingredients:

| Ingredient: | Amount (grams) |
|---|---|
| Water | 220.0 |
| Dispersant (sodium salt of diisobutylene-maleic anhydride copolymer)—"TAMOL 731" dispersant, obtained from Rohm and Haas | 7.0 |
| $TiO_2$ | 180.0 |
| Mica | 30.0 |
| $CaCO_3$ | 100.0 |
| Clay filler | 45.0 |
| Ethylene glycol | 15.0 |

Ingredient: Amount (grams)
Polypropylene glycol (molecular weight approximately 1200)—"Polyglycol P-1200," obtainable from The Dow Chemical Company _____ 2.0
Hydroxypropyl methyl cellulose (82 percent solution, viscosity 4000 cps.)—"Methocel 65 HG," obtainable from The Dow Chemical Company _____ 4.0
Antifoam agent (1:1 volume solution of a salt of a sulfated fatty acid and water)—"Nopco 1497," obtainable from Nopco Chemical Company _____ 10.0
Phenyl mercurial preservative—"Butrol" preservative, obtainable from Buckmann Laboratories _____ 6.0
Emulsifier (Alkanolamine condensate)—"EMCOL 5138," obtainable from Witco Chemical Company _____ 8.0

Pine panels were primed with two coats of house paint undercoater (Sherwin-Williams "A-100 House Paint Wood Undercoater") with a six hour interval between coats. The final coat was allowed to dry 10 days. Each of the topcoat latex paints to be tested (prepared as above) was painted in two coats on the primed surfaces at a four hour interval and allowed to dry for 5 days before testing.

The dried panels were tested by placing water on the surface and scratching the wet area every minute with a metal spatula tip using moderate pressure. This is a conventional qualitative test for measuring the adhesion properties of paint. When a break in the film occurred, the length of time which the panel was immersed in water was recorded. The results are given in Table 1.

Table 1

| Topcoat latex formulation from Example No.: | Minutes to film break |
|---|---|
| III | 55 |
| IV | 20 |
| V | 4 |

EXAMPLE VI

*General procedure*

A lacquer containing in the polymer 5.0% by weight of N-(cyanoethyl)-2-aminoethyl acrylate was prepared as follows: in a 2-liter pot equipped for stirring, heating, condensing, and nitrogen sparging was mixed 250 grams of toluene, 250 grams of methyl ethyl ketone, and 100 grams of ethanol. With nitrogen sparging and stirring this solvent mixture was heated to reflux (95° C.). The sparging was stopped and dropwise addition was begun of a mixture of 200 grams of styrene, 132.5 grams of butyl acrylate, 7.5 grams of acrylic acid (.104 mole), and 3.3 grams of azobisisobutyronitrile. The addition was completed in about 30 minutes. Heating was continued for another 20 hours, then the solution polymer was cooled to 60° C. and 10.0 grams (.104 mole) of N-(cyanoethyl) aziridine was added dropwise. Heating at 60° C. was continued for two hours. The finished lacquer was cooled and analyzed. It contained 36% solids and had an amine equivalent weight by acid titration of 3850.

EXAMPLE VII

Using the general procedure of Example VI, an identical lacquer was made but without adding the N-(cyanoethyl) aziridine.

EXAMPLE VIII

Using the general procedure of Example VI, a third lacquer sample was made in which both the N-(cyanoethyl) aziridine and the acrylic acid were omitted.

The three lacquers described in Examples VI–VIII were cast as 1.2–1.5 mil films on Bonderite steel panels and allowed to dry for 5 days. Portions of the resulting coatings were then covered with tap water and scratched each minute with the tip of a steel spatula beneath the water. Moderate pressure was used. The averages of two tests for each coating are given in Table 2. Failure was considered to have occurred when the coating actually peeled from the panel without tearing. Simple loss of film through abrasion was not considered failure.

Table 2

| Example No.: | Time required to produce peeling under water |
|---|---|
| VI | 36½ minutes. |
| VII | 12 minutes (film whitened). |
| VIII | 22½ minutes. |

Table 2 shows that the addition of the cyano-containing amino ester of acrylic acid produces improved adhesion in polymeric lacquers (nonaqueous).

We claim as our invention:

1. A compound of the formula

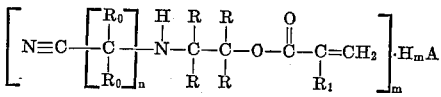

wherein:

(a) $n$ is an integer of from 1 to 5,
(b) each of $R_0$ and $R$ is hydrogen or an alkyl group of from 1 to 4 carbon atoms,
(c) $R_1$ is hydrogen or a methyl group,
(d) $m$ is an integer of from 1 to 3 representing the valence of the anion A, and
(e) A is $Cl^-$, $Br^-$, $I^-$, $F^-$, $PO_4^\equiv$, $SO_4^=$, or $HPO_4^=$.

2. A compound of the formula:

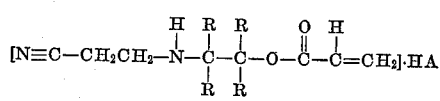

wherein:

(a) R is hydrogen or an alkyl group of from 1 to 4 carbon atoms, and
(b) A is $Cl^-$, $Br^-$, $I^-$, or $F^-$.

3. A compound of the formula:

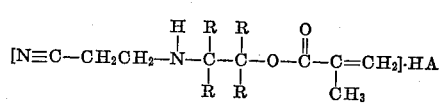

wherein:

(a) R is hydrogen or an alkyl group of from 1 to 4 carbon atoms, and
(b) A is $Cl^-$, $Br^-$, $I^-$, or $F^-$.

4. The compound:

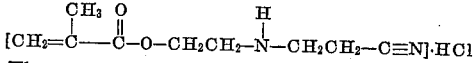

5. The compound:

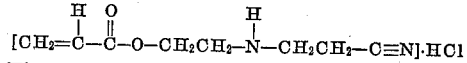

6. The compound:

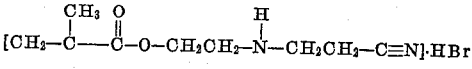

References Cited

UNITED STATES PATENTS

| 2,634,203 | 4/1953 | Mowry et al. | 260—465.4 X |
| 2,720,512 | 10/1955 | Butler | 260—465.4 X |
| 3,031,436 | 4/1962 | Prager et al. | 260—465.4 X |
| 3,227,628 | 1/1966 | Hess | 260—465.4 X |

CHARLES B. PARKER, *Primary Examiner.*

JOSEPH P. BRUST, *Examiner.*